(12) United States Patent
Sekaran (10) Patent No.: US 8,060,640 B2
(45) Date of Patent: Nov. 15, 2011

(54) COMBINING SIP REQUESTS WITH SIP RESPONSES

(75) Inventor: Dhigha Sekaran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 704 days.

(21) Appl. No.: 11/140,467

(22) Filed: May 27, 2005

(65) Prior Publication Data

US 2006/0271686 A1 Nov. 30, 2006

(51) Int. Cl.
*G06F 15/16* (2006.01)
(52) U.S. Cl. ........ 709/232; 709/206; 709/227; 709/204; 370/235; 455/432.1
(58) Field of Classification Search .................... 709/232
See application file for complete search history.

(56) References Cited

U.S. PATENT DOCUMENTS

| 4,646,300 | A * | 2/1987 | Goodman et al. | ............ 714/749 |
| 7,170,863 | B1 * | 1/2007 | Denman et al. | ............... 370/260 |
| 2004/0121765 | A1 * | 6/2004 | Idnani et al. | ................ 455/422.1 |
| 2004/0254992 | A1 * | 12/2004 | Kiss et al. | ...................... 709/206 |
| 2006/0193259 | A1 * | 8/2006 | Sanchez Cembellin et al. | ............................ 370/235 |

OTHER PUBLICATIONS

Day et al.; RFC 2778; "A Model for Presence and Instant Messaging"; Feb. 2000.*
Rosenberg et al.; RFC 3261; "SIP: Session Initiation Protocol"; Jun. 2002.*
Sparks, R.; RFC 3515; "The Session Initiation Protocol (SIP) Refer Method"; Apr. 2003.*
RFC 3856 "A Presence Event Package for the Session Initiation Protocol (SIP)" (dated Aug. 2004) to Rosenberg. ("J_Rosenberg").*
RFC 3859 "Common Profile for Presence (CPP)" (dated Aug. 2004) to Petersen. ("Petersen").*
RFC 3863 "Presence Information Data Format (PIDF)" (dated Aug. 2004) to Sugano et al. ("Sugano").*
RFC 3840 "Indicating User Agent Capabilities in the Session Initiation Protocol (SIP)" (dated Aug. 2004) to Schulzrinne et al. ("Schulzrinne").*
IETF Internet Draft "Nonfinal Mobility Header for Mobile IPV6" draft-ietf-mobileip-piggyback-00.txt; version: 00; Charles Perkins and Francis Dupont (Apr. 15, 2002).*
A> B. Roach, "Session Initiation Protocol (SIP)—Specific Event Notification," Jun. 2002 (36 pages) http://www.ietf.org/rfc/rfc3265.
J. Rosenberg et al., "SIP: Session Initiation Protocol," Jun. 2002 (252 pages) http://www.ietf.org/rfc/rfc3261.

* cited by examiner

*Primary Examiner* — Phouc Nguyen
*Assistant Examiner* — June Sison
(74) *Attorney, Agent, or Firm* — Perkins Coie LLP (57) ABSTRACT

A method and system for combining SIP requests with SIP responses is provided. When a server receives a request from a client, a message combining system of the server sends a response to the request that includes the content of a request that the server would normally send to the client in a separate request. The message combining system of the server composes a response as it would normally and adds the content of the subsequent request to the response. The server then sends the combined response and request to the client. When the client receives the response, it retrieves and processes the combined request.

15 Claims, 7 Drawing Sheets

[Protocol – Header on Subscribe]

FIG. 4

[Protocol – Sequence on Reply]

FIG. 5

[Flow – Client Behavior]

COMBINING SIP REQUESTS WITH SIP RESPONSES

BACKGROUND

Real-time conversations between conversation participants via their computer systems are becoming increasingly common. Such real-time conversations require that the participants be present at their computer systems (e.g., personal digital assistants) and able to respond when a communication is received. A common form of real-time conversation is provided by instant messaging services. An instant messaging service allows participants to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

Instant messaging services require a networking protocol to establish and manage communications between participants. These services may use various mechanisms to establish sessions, such as a "session initiation protocol" ("SIP"). SIP is an application-layer control protocol that computer systems can use to discover one another and to establish, modify, and terminate sessions. SIP is an Internet proposed standard. Its specification, "RFC 3261," is available at <http://www.ieff.org/rfc/rfc3261.txt>. A specification for extensions to SIP relating to event notifications, "RFC 3265," is available at <http://www.ieff.org/rfclrfc3265.txt>. Both of these specifications are incorporated herein in their entirety by reference.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

Typical instant messaging services provide a presence service, which can be a SIP registrar, which maintains status information about each user of the instant messaging service. The presence service may also maintain a list of contacts with whom a user frequently communicates. The status information for each user may be represented in the form of a document, called the presence document. An instant messaging user begins using the instant messaging service by registering an endpoint with the presence service. As part of the registration process, the presence service provides the user's contact list to the endpoint. After registration, the endpoint sends periodic updates to the presence service specifying the user's current status, typically by uploading the latest presence document for the user. The endpoint also subscribes to the presence information of each of the user's contacts so that at any time the status of a contact is readily available.

An endpoint typically subscribes to a contact's presence information by sending a SIP SUBSCRIBE request. The SUBSCRIBE request contains headers specifying the contact to subscribe to, the type of event of interest, and the duration of the subscription. For example, an endpoint may subscribe to the presence information of a user's contact by sending a subscribe request to a presence server indicating the contact, an event type of "presence," and a duration of four hours. The presence server will provide the presence information of that contact initially and whenever it changes, but will stop providing the presence information after the duration ends. The server determines the actual duration using the duration specified by the endpoint as a recommendation. A duration value of zero is reserved for unsubscribing to a particular event, while a missing duration header indicates that the server should use a default value. The server includes the actual duration value that it chooses in the "Expires" header of the response to the SUBSCRIBE request. If the subscription was successful, the response sent from the server contains "200 OK." When a subscription's duration has nearly ended, the endpoint may send a new SUBSCRIBE request in order to refresh the subscription and ensure that the server does not terminate the subscription. Until the subscription terminates, the presence server sends to the endpoint NOTIFY requests that contain event-specific data whenever an event of the subscribed type occurs. The endpoint will typically respond to the NOTIFY request with "200 OK." Each NOTIFY request contains a sequence number so that older requests can be distinguished from newer requests and discarded.

In a typical scenario, an endpoint registers with the presence service. The endpoint then sends SUBSCRIBE requests to the presence service for each of the contacts on the user's contact list specifying a non-zero subscription expiration and an event type of "presence." The presence service sends a response to each request indicating success or failure of the subscription. After a successful subscription, the presence service sends to the endpoint a NOTIFY request containing the current presence document of the subscribed-to contact. The endpoint sends a response to each NOTIFY request indicating success or failure of the notification. Therefore, an endpoint and server exchange four messages for each contact to which a user subscribes: a SUBSCRIBE request, SUBSCRIBE response, NOTIFY request, and NOTIFY response.

It is not uncommon for a user to have many contacts, even 100 or more, or for many endpoints to attempt to register with the instant messaging service at the same time. For example, in one system it is common to see a peak in the number of registration requests around 8 a.m. when many people are arriving at work. A server can quickly become overwhelmed by the quantity of messages and bandwidth consumed by many endpoints registering at the same time. For example, if the endpoints of 1,000 users each having 100 contacts attempt to register at about the same time, the server would have to handle 400,000 messages just to support the initial subscriptions. In addition, as later endpoints register, the presence service needs to provide their updated presence information to the subscribing endpoints. Thus, if 99 endpoints have already subscribed to a user's presence information and an endpoint of the user then registers, the presence information system may send a NOTIFY request to each of the 99 subscribing endpoints, resulting in 198 total messages being exchanged. The high volume of messages limits the number of users that an instant messaging service can support.

SUMMARY

A method and system for combining SIP requests with SIP responses is provided. When a server receives a request from a client, a message combining system of the server sends a response to the request that includes the content of a request that the server would normally send to the client in a separate request. The message combining system of the server composes a response as it would normally and adds the content of the subsequent request to the response. The server then sends the combined response and request to the client. When the client receives the response, it retrieves and processes the combined request. In this way, a request that normally would be sent in a separate message is combined with a response, resulting in only one message being sent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for combining SIP requests with SIP responses is provided. In one embodiment, when a server receives a request from a client, a message combining system of the server sends a response to the request that includes the content of a request that the server would normally send to the client in a separate request. The message combining system of the server composes a response as it would normally and adds the content of the subsequent request to the response. The server then sends the combined response and request to the client. When the client receives the response, it retrieves and processes the combined request. For example, the message combining system combines an initial SIP NOTIFY request providing presence information of a contact with the response to the client's SUBSCRIBE request. A client begins using the instant messaging service by registering with the presence service and subscribing to presence events for each contact on the user's contact list. The client subscribes to each contact by sending a SUBSCRIBE request to the presence service. The presence service forms a normal response to the SUBSCRIBE request, but before sending the response adds to the response the initial NOTIFY request that the presence service would normally send in a later, separate message. In this way the presence service sends only one message to the client where formerly two were sent. Also, because the client does not receive a separate NOTIFY request, there is no need for the client to send a separate response to the NOTIFY request, thereby eliminating another message between the client and presence service. Using this method, the presence service reduces the number of messages sent to set up subscriptions per contact from four to two.

In one embodiment, the message combining system allows clients and servers that support combining to interoperate with those that do not. The servers and clients use a custom header to indicate support of the message combining feature. For example, when a client sends a SUBSCRIBE request to the presence service, the client can add a "ms-piggyback-first-notify" header as an extension to the request to indicate to the server that the client supports combining the first NOTIFY request with the SUBSCRIBE response. If the server supports this feature, the server inspects the SUBSCRIBE request for this header to determine if the client supports the feature. If the client does support the feature, the server can indicate its support to the client by including the "ms-piggyback-first-notify" as an extension to the SUBSCRIBE response. Upon receiving the SUBSCRIBE response, the client determines whether the server supports this feature by the presence of the header and processes the response accordingly. If either the client or the server does not support this feature, then the server and client can use the old method of exchanging a separate NOTIFY request after the server sends the SUBSCRIBE response.

In some embodiments, the combining system provides for resending a lost combined message. Networks such as the Internet are unpredictable, and it is common for network packets to get lost. Typical network protocols provide for acknowledging the receipt of each message. A sender typically waits a certain time for the acknowledgement, and if it is not received within that time, the sender resends the message until an acknowledgement is received. SIP uses this mechanism by providing a response to each request which acts as an acknowledgement of the request. However, when the message combining system combines a SIP request with a response, the client will not send the server a separate response to acknowledge receipt of the request. If the client does not receive the combined response and request because it is lost, the server will not independently detect that it needs to be resent. If a client does not receive a response within a certain time period, the client may resend the request until a response is received to acknowledge the request. Each time the server receives the resent request, it resends the combined response and request. In this way the combining system provides for resending a lost combined message. For example, if a client sends a SUBSCRIBE request to the server and the server sends a combined SUBSCRIBE response and NOTIFY request to the client that is lost, the client will resend the SUBSCRIBE request until the combined message is received because the client is waiting for a response acknowledging receipt of the SUBSCRIBE request.

Figure 1:
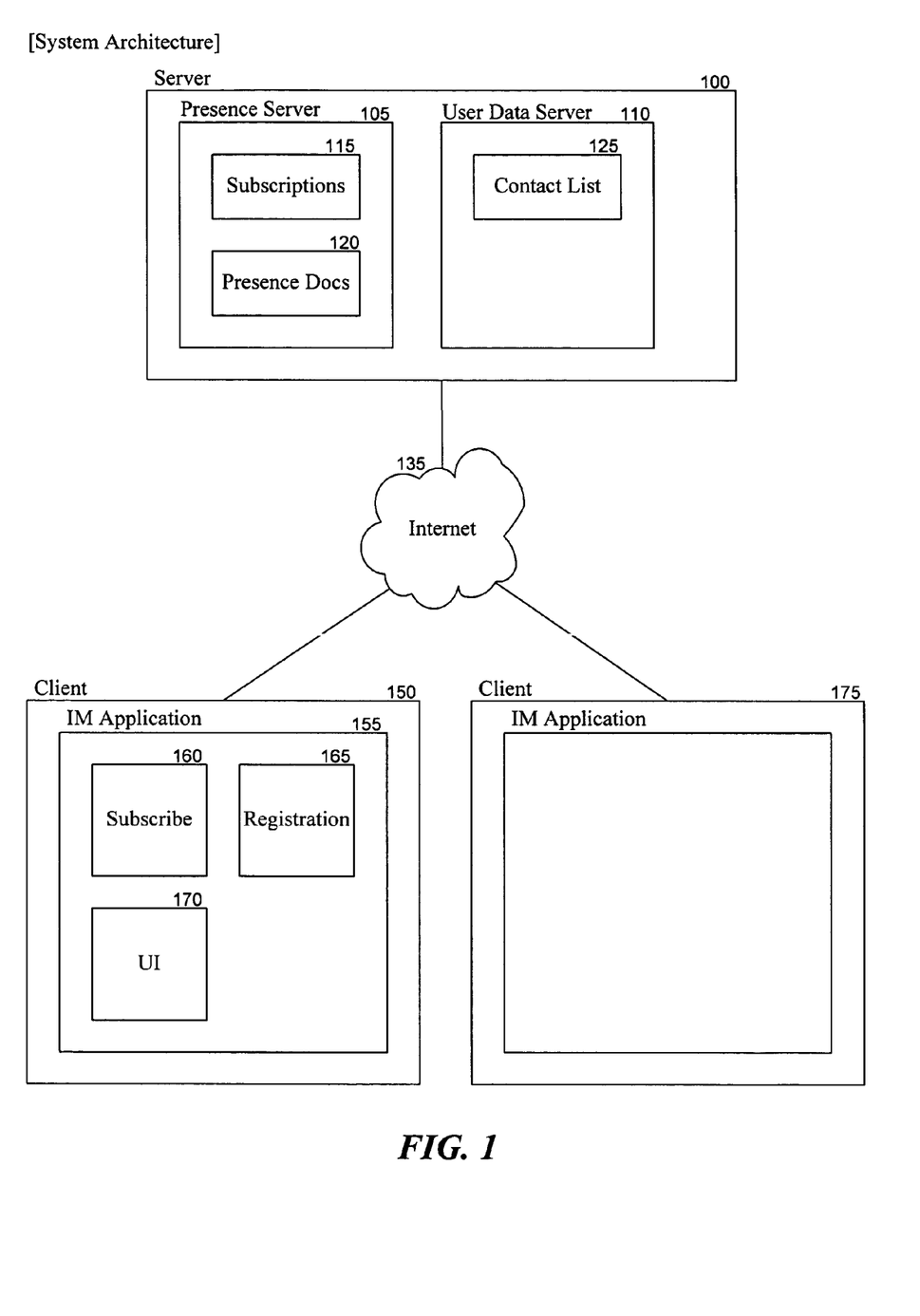
FIG. 1 is a block diagram that illustrates components of the message combining system in one embodiment.

FIG. 1 is a block diagram that illustrates components of the message combining system in one embodiment. An instant messaging service is made up of a server 100 connected to one or more instant messaging clients 150 and 175 through the Internet 135. The server 100 contains a presence server 105 and a user data server 110. The presence server 105 contains a subscriptions component 115 and a presence document store 120. The subscriptions component maintains for each user the current list of users who are subscribed to that user's presence information. The presence document store contains the presence document for each user indicating the user's current status on the instant messaging service. The user data server maintains persistent data for each user and contains a contact list store 125. The contact list store contains a list of each user's contacts. The server provides the list of contacts of a user to the registered endpoints of that user. The instant messaging clients contain an instant messaging application 155. The instant messaging application contains a subscribe component 160, a registration component 165, and a user interface component 170. The subscribe component subscribes to the presence information of the user's contacts. The registration component registers the endpoint of the user with the instant messaging service and publishes updates to the user's presence information. The user interface component provides windows and other graphical elements that are presented to the user while interacting with the instant messaging application. In a typical scenario, the user begins using the instant messaging service by starting the instant messaging application at an endpoint. The application invokes the registration component to register the endpoint with the user data server and presence server, retrieve the user's list of contacts, and provide initial presence information about the user. The application invokes the subscribe component to subscribe to each of the user's contacts. The presence server provides an initial presence document about each of the subscribed contacts, and sends an updated presence document when the presence for any of the contacts changes.

The computing device on which the system is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
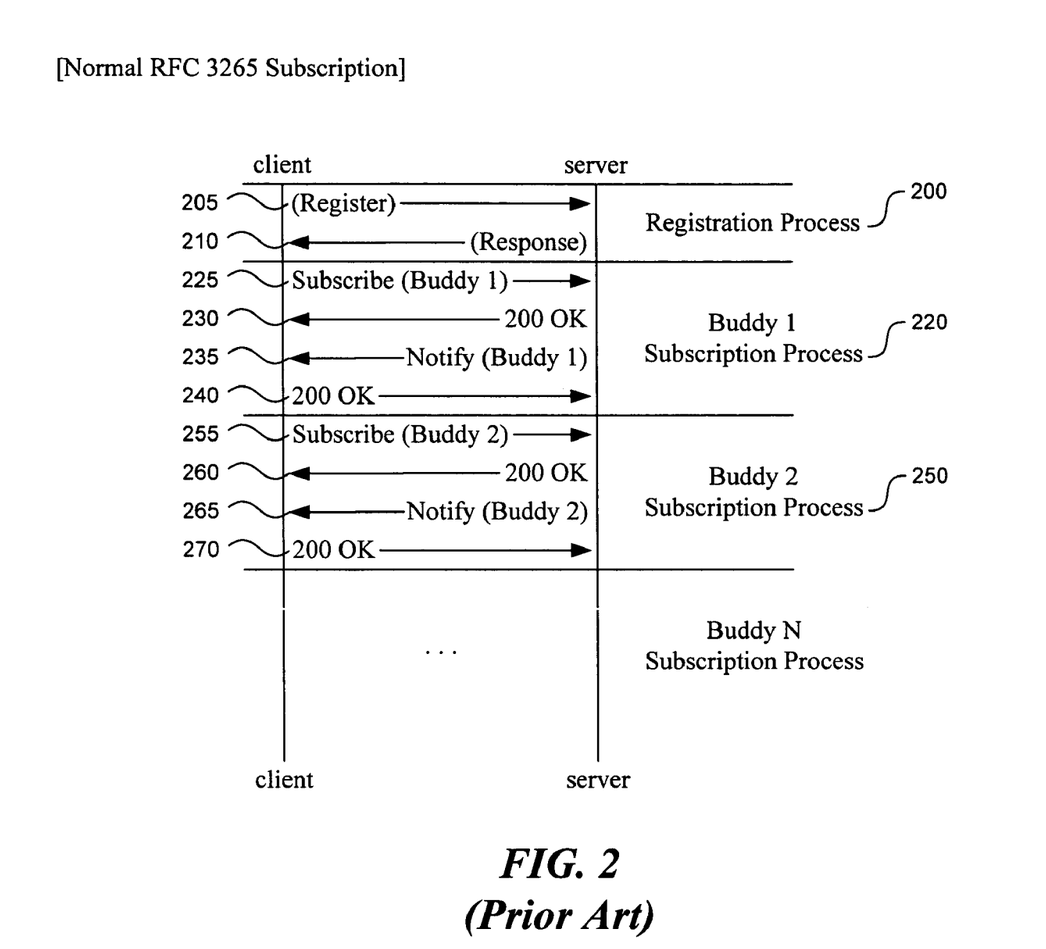
FIG. 2 is a network diagram showing the flow of messages in a prior art SIP subscription system when an instant messaging user begins using the instant messaging service.

FIG. 2 is a network diagram showing the flow of messages in a prior art SIP subscription system when an instant messaging user begins using the instant messaging service. Arrows from the left to the right indicate messages sent from the client to the server, while arrows from the right to the left indicate messages sent from the server to the client. Time progresses moving down the diagram such that messages at the top of the diagram are sent earlier in time than those at the bottom. The SIP registration process 200 includes a register request 205 sent from the client and a response 210 sent from the server. The SIP subscription to a first contact 220 includes a SUBSCRIBE request 225 sent from the client, followed by a response 230 sent from the server. The server then sends a first NOTIFY request 235, which is followed by a response 240 sent from the client. The SIP subscription to a second contact 250 is a similar four-message process involving a SUBSCRIBE request 255 sent from the client, a response 260 sent from the server, a NOTIFY request 265 sent from the server, and a response 270 sent from the client. The client performs this four-message subscription process for each contact on the user's contact list.

Figure 3:
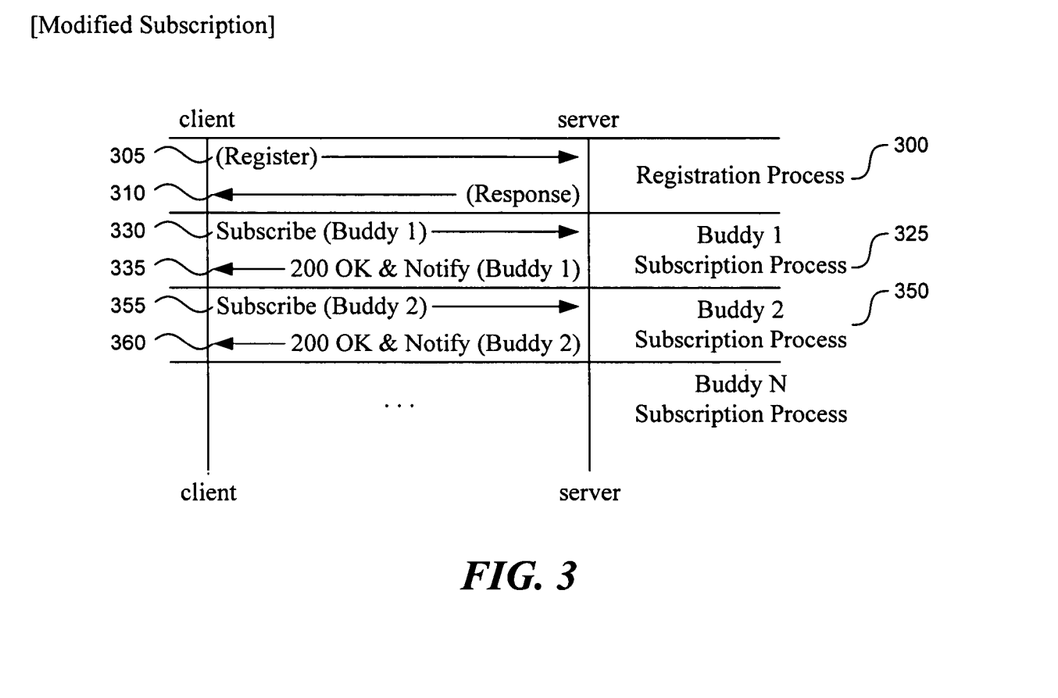
FIG. 3 is a network diagram showing the flow of messages in the message combining system when an instant messaging user begins using the instant messaging service.

FIG. 3 is a network diagram showing the flow of messages in the message combining system when an instant messaging user begins using the instant messaging service. The SIP registration process 300 includes a register request 305 sent from the client and a response 310 sent from the server. The SIP subscription to a first contact 325 includes a SUBSCRIBE request 330 sent from the client, followed by a response 335 sent from the server. The response 335 includes both the response to the SUBSCRIBE request and a combined NOTIFY request from the server. The SIP subscription to a second contact 350 is a similar two-message process involving a SUBSCRIBE request 355 sent from the client and a response 360 sent from the server which includes both the SUBSCRIBE response and a NOTIFY request from the server. The client performs this two message subscription process for each contact on the user's contact list.

Figure 4:
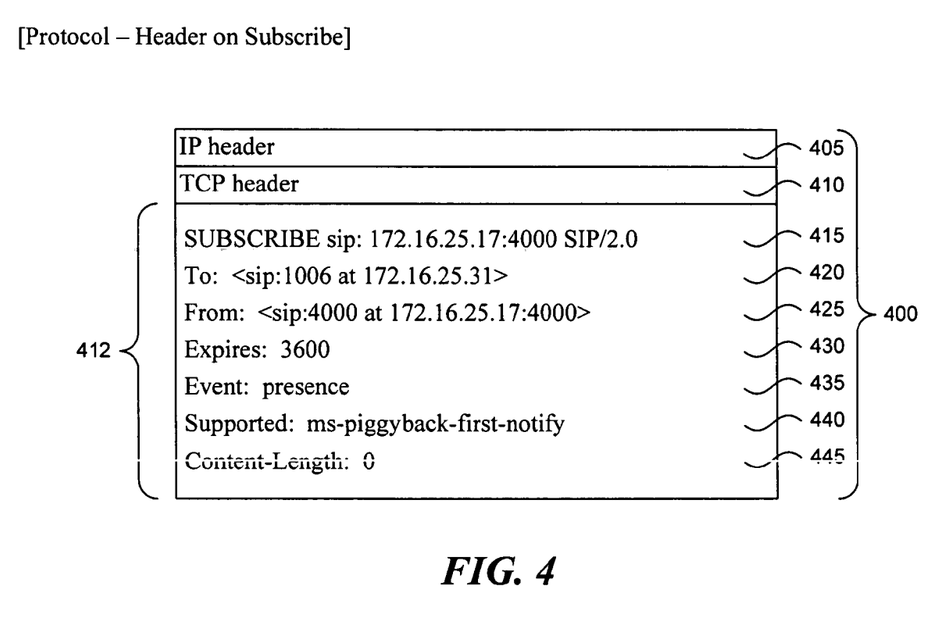
FIG. 4 shows the contents of a SUBSCRIBE request sent to a presence server in one embodiment of the message combining system.

FIG. 4 shows the contents of a SUBSCRIBE request sent to a presence server in one embodiment of the message combining system. The SUBSCRIBE message 400 includes an IP header 405, a TCP header 410, and a SIP message 412. Protocols other than TCP/IP may be used for the underlying transport. The SIP message 412 includes a request line 415 with SUBSCRIBE method, a To header 420, a From header 425, an Expires header 430, an Event header 435, a Supported header 440, and a Content-Length header 445. The To header specifies which endpoint the sender of this packet is subscribing to. The From header specifies the endpoint of the sender which is used to send NOTIFY requests once the subscription is established. The Expires header has a value of 3600 indicating that the sender is requesting a subscription for 3600 seconds, or one hour. The Event header specifies the event that the sender wants to receive notifications for, in this case presence events. The Supported header specifies any special behavior that the sender supports and has a value to "ms-piggyback-first-notify," indicating that this sender supports a response from the server that combines a NOTIFY request with the SUBSCRIBE response. The Content-Length header has a value of 0 indicating that no data follows the SIP message header.

Figure 5:
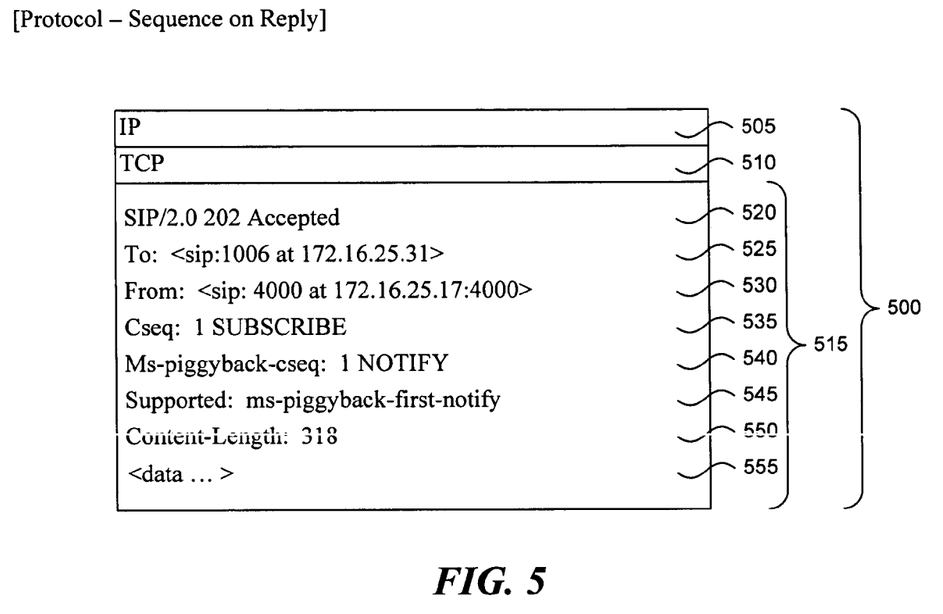
FIG. 5 shows the contents of a SUBSCRIBE response sent to a SIP client by the presence server in one embodiment of the combining system.

FIG. 5 shows the contents of a SUBSCRIBE response sent to a SIP client by the presence server in one embodiment of the message combining system. The packet 500 includes an IP header 505, a TCP header 510, and a SIP message 515. Protocols other than TCP/IP may be used for the underlying transport. The SIP message 515 includes a SIP response identifier 520, a To header 525, a From header 530, a CSeq header 535, an Ms-piggyback-cseq header 540, a Supported header 545, a Content-Length header 550, and data 555. The SIP response identifier 520 identifies the SIP version as 2.0 and the status of the request as "202 Accepted" indicating that the subscription succeeded. The To header 525 specifies the endpoint that the original sender of the request has subscribed to. The From header 530 specifies the original sender of the request. The CSeq header 535 is contained on every message, both requests and responses, from the SIP server and is used as a sequence number to determine the relative order of messages from the server. A different sequence number is created for each SIP dialog, and the sequence number typically specifies the type of request that created the dialog. For example, the CSeq header 535 has a value of 1 SUBSCRIBE indicating that this is the first message from the server in the dialog created by a SUBSCRIBE request between the endpoints specified by the To and From headers. Messages with a lower sequence number were sent from the server earlier than messages with a higher sequence number. The Ms-piggyback-cseq header 540 is a custom header defined by the message combining system that is used to contain the sequence number that would be transmitted on the NOTIFY request if it were not combined with the SUBSCRIBE response. In this way, the client can read this header and process the combined NOTIFY request in much the same way a separate NOTIFY request is processed. The Supported header 545 specifies special behavior that the server supports and has a value of "ms-piggyback-first-notify," indicating that this server supports a response from the server that combines a NOTIFY request with the SUBSCRIBE response. This header can be used by the client to determine if the message contains a combined NOTIFY request that should be processed. The Content-Length header 550 has a value of 318 indicating that 318 bytes of data follow the SIP message header. The data 555 for a NOTIFY request typically specifies the presence document for the endpoint producing the notification.

Figure 6:
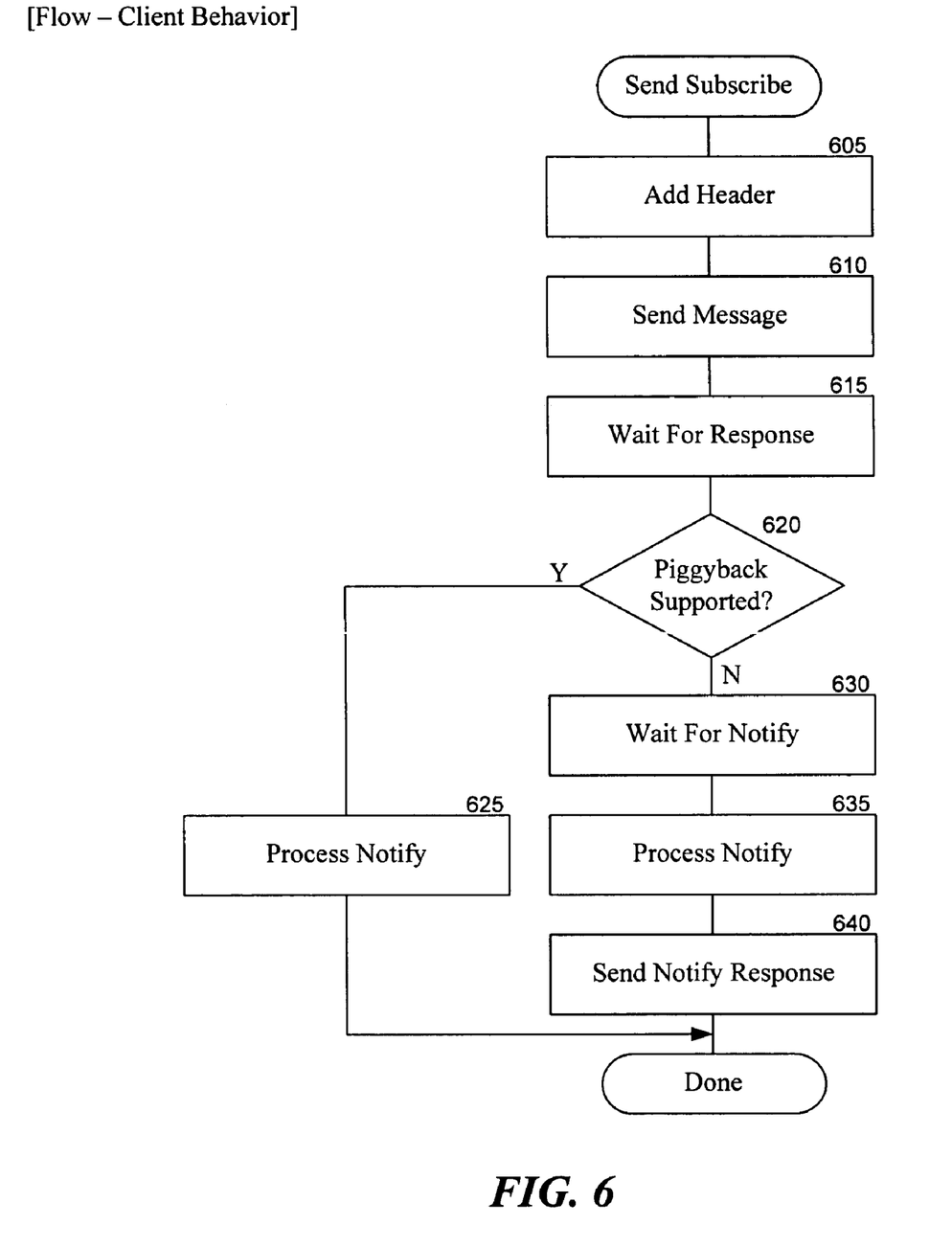
FIG. 6 is a flow diagram that illustrates the processing of a client subscribe component of an instant messaging endpoint in one embodiment.

FIG. 6 is a flow diagram that illustrates the processing of a client subscribe component of an instant messaging endpoint in one embodiment. The component is invoked when a user subscribes to presence events for a contact on the user's contact list. In block 605, the component creates a SUBSCRIBE request and adds a header value "ms-piggyback-first-notify" to the Supported header to indicate that the client supports combining the first NOTIFY message on the SUBSCRIBE response. In block 610, the client sends the SUBSCRIBE request to the server. In block 615, the client waits for a response from the server, and may send the SUBSCRIBE request again if a response is not received within a certain time. In decision block 620, if the response from the server indicates that combining is supported, then the component continues at block 625, else the component continues at block 630. In block 625, the component processes the combined SUBSCRIBE response and NOTIFY request and then completes. In block 630, the component processes the received SUBSCRIBE response, then waits for a first NOTIFY request from the server. In block 635, the component processes the NOTIFY message received from the server. In block 640, the component sends a response to the NOTIFY request to the server. The component then completes.

Figure 7:
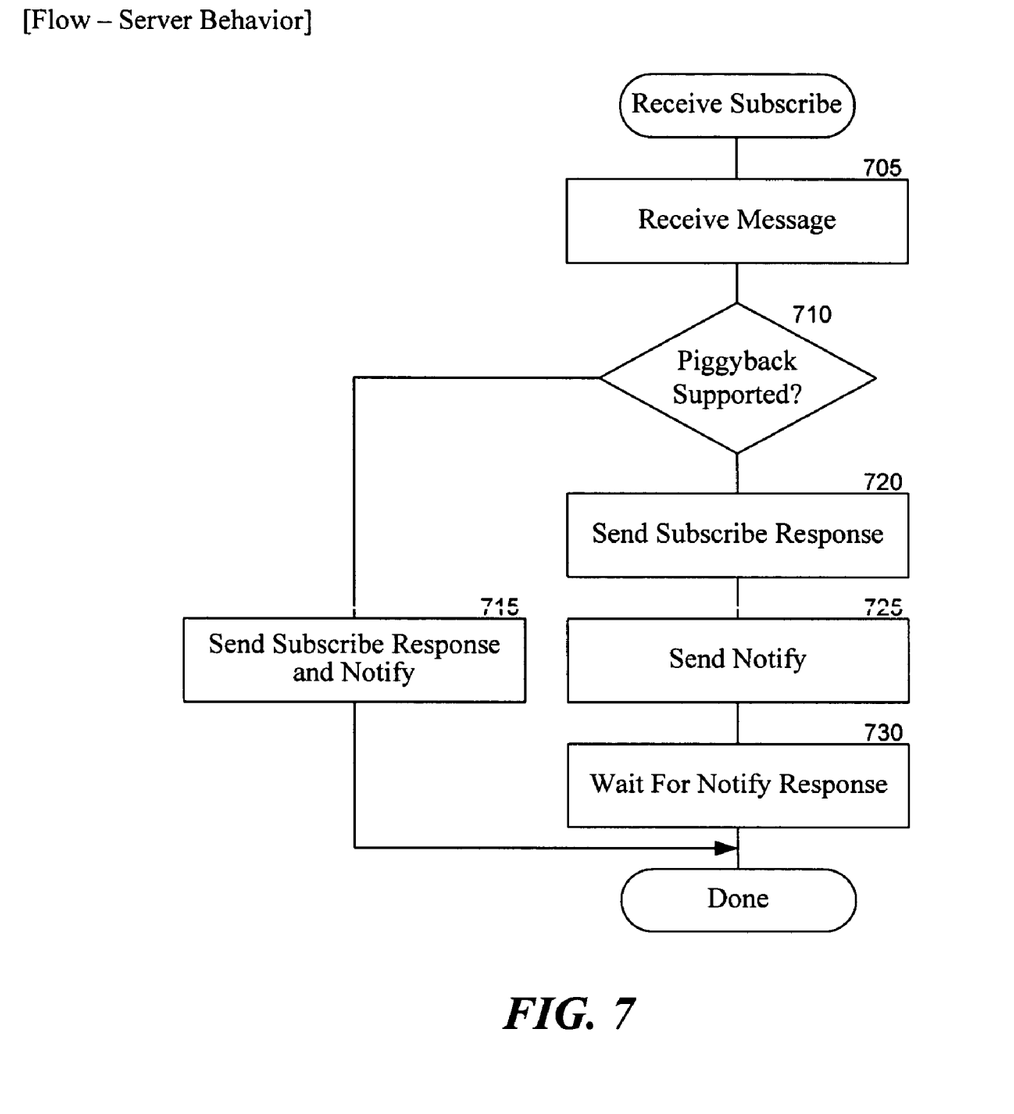
FIG. 7 is a flow diagram that illustrates the processing of a SIP server subscriptions component in one embodiment.

FIG. 7 is a flow diagram that illustrates the processing of a SIP server subscriptions component in one embodiment. The component is invoked when a SUBSCRIBE request is received from a client. In block 705, the component receives a SUBSCRIBE request from a client. In decision block 710, if the request indicates that the client supports combining the first NOTIFY request with the SUBSCRIBE response, then the component continues at block 715, else the component continues at block 720. In block 715, the component sends a combined SUBSCRIBE response and NOTIFY request in a single message to the client and then completes. In block 720, the component sends a SUBSCRIBE response. In block 725, the component sends a first NOTIFY request. In block 730, the component waits for a NOTIFY response from the client. When the NOTIFY response is received, the component completes.

From the foregoing, it will be appreciated that specific embodiments of the system have been described herein for purposes of illustration, but that various modifications may be made without deviating from the spirit and scope of the invention. Though the combining of SIP NOTIFY requests with SIP SUBSCRIBE responses has been described, it will be appreciated by those of ordinary skill in the art that other SIP requests and responses can be similarly combined. For example, while two instant message users are typing instant messages back and forth, it is common for instant messaging applications to send a message indicating that the user is typing before the text being typed is available. These typing messages from one user can be combined with a response to a previous message from another user. Other messages can similarly be combined. Accordingly, the invention is not limited except as by the appended claims.

I claim:

1. A method in a computer system for reducing network traffic that uses a session initiation protocol ("SIP") to provide presence information, the method comprising:
   receiving at a server SIP requests from clients, the received SIP requests requesting to subscribe to presence information provided by the server; and
   for each received SIP request received from one of the clients,
      creating a SIP response to the received SIP request from the client, the created SIP response indicating that client has been successfully subscribed to presence information provided by the server;
      creating a SIP notify request that includes presence information provided by the server;
      determining whether the received SIP request from the client includes an indication that the client supports combining SIP requests with SIP responses and whether the server supports combining SIP requests with SIP responses;
      upon determining that not both the client and the server support combining SIP requests with SIP responses, sending to the client the created SIP response;
         sending to the client separately from the created SIP response the created SIP notify request wherein the client sends a SIP notify response to the SIP notify request when the SIP notify request is sent separately from the created SIP response; and
         when a SIP notify response to the sent SIP notify request is not received from the client within a certain time period, sending to the client another SIP notify request that includes presence information provided by the server; and
      upon determining that both the client and the server support combining SIP requests with SIP responses, adding to the created SIP response the created SIP notify request and an indication that the server supports combining SIP notify requests with SIP responses;

sending to the client the created SIP response including the added SIP notify request from the server wherein the client does not send a SIP notify response to the SIP notify request added to the SIP response; and when the client does not receive the sent SIP response including the added SIP notify request, receiving at the server the SIP request that is resent from the client so that when both the client and the server support combining SIP requests, a separate SIP request notifying the client of initial presence information to which the client has subscribed is avoided.

2. The method of claim 1 wherein the server and client are part of an instant messaging service.

3. The method of claim 1 wherein the SIP response to the client contains a sequence number that would be contained on the combined SIP request were it sent separately.

4. The method of claim 1 wherein the client indicates that it supports combining requests by adding a special header to the SIP request.

5. The method of claim 4 wherein the server adds the special header to the SIP response to reflect it back to the client.

6. The method of claim 1 wherein the server is a presence server.

7. The method of claim 1 wherein the SIP request from the server includes a presence document.

8. A method in computer systems for reducing network traffic that uses SIP, the method comprising:

sending a first SIP request from a client to a first server, the first SIP request requesting to subscribe to first presence information and indicating that the client supports the first server combining a first SIP notify request with a first SIP response to the first SIP request;

upon receiving the first SIP request at the first server;
determining by the first server whether the first SIP request indicates that the client supports the first server combining the first SIP notify request with the first SIP response; and upon determining that the first SIP request indicates support, sending from the first server to the client the first SIP response that includes the first SIP notify request that includes the first presence information;

waiting at the client for the first SIP response;

when the first SIP response is received from the first server,
determining by the client from the first SIP response whether the first SIP response includes the first SIP notify request; and when it is determined that the first SIP response includes a the first SIP notify request, retrieving by the client the first SIP notify request from the first SIP response without sending to the first server a first SIP notify response to the first SIP notify request; and when a second SIP notify request is received by the client from the first server after the first SIP notify response is received from the first server, sending from the client a second SIP notify response to the first server; and when the first SIP response is not received from the first server, resending the first SIP request from the client to the first server;

sending a second SIP request from the client to a second server, the second SIP request requesting to subscribe to second presence information and indicating that the client supports the second server combining a third SIP notify request with a second SIP response to the second SIP request;

upon receiving the second SIP request at the second server;
sending from the second server to the client the second SIP response; and sending from the second server to the client the third SIP notify request separately from the second SIP response;

waiting at the client for the second SIP response;

when the second SIP response is received from the second server,
determining by the client from the second SIP response whether the second SIP response includes the third SIP notify request; and when it is determined that the second SIP response does not include the third SIP notify request and upon receiving the third SIP notify request, sending to the second server a third SIP notify response to the third SIP notify request so that a number of separate communications sent from the first server to the client and from the client to the first server is reduced when the first server supports combining the first SIP notify request with the first SIP response but a number of separate communication sent from the second server to the client and from the client to the second server is not reduced when the second server does not support combining the third SIP notify request with the second SIP response.

9. The method of claim 8 wherein the server and client are part of an instant messaging service.

10. A computer-readable storage device containing instructions for controlling a first device to perform a method comprising:

receiving at the first device a SIP request from a second device, the SIP request indicating whether the second device supports combining SIP requests with SIP responses;

creating a SIP response to the SIP request;

receiving from a user text of an instant message during an instant message session;

when the SIP request does not indicate that the second device supports combining SIP requests with SIP responses, sending to the second device the created SIP response;

sending to the second device separately from the SIP response a SIP request that includes information provided by the first device wherein the second device sends a SIP response to a SIP request when the SIP request is sent separately from the SIP response, the information indicating that text of an instant message is being received from the user by typing of the text by the user; and when a SIP response to the sent SIP request is not received from the second device, resending to the second device the SIP request that was sent separately; and when the SIP request indicates that the second device supports combining SIP requests with SIP responses, adding to the SIP response a SIP request that includes information provided by the first device, the information indicating that text of an instant message is being received from the user by typing of the text by the user; and sending to the second device the SIP response including the added SIP request wherein the second device does not send a SIP response to the SIP request added to the SIP response so that the first device can avoid sending a SIP request that is separate from the sending of the SIP response.

11. The computer-readable storage device of claim 10 wherein the SIP response to the second device contains a sequence number that would be contained on the combined SIP request were it sent separately.

12. The computer-readable storage device of claim 10 wherein the second device indicates that it supports combining requests by adding a special header to the SIP request.

13. The computer-readable storage device of claim 12 wherein the first device adds the special header to the SIP response to reflect it back to the second device.

14. The computer-readable storage device of claim 10 wherein the first device is a presence server.

15. The computer-readable storage device of claim 10 wherein the SIP request from the first device includes a presence document.

* * * * *